United States Patent [19]

Cusimano et al.

[11] Patent Number: 4,672,171

[45] Date of Patent: Jun. 9, 1987

[54] PLASMA TRANSFER WELDED ARC TORCH

[75] Inventors: Andrew D. Cusimano, Harrison; Danny W. Humes, Mt. Judea, both of Ark.

[73] Assignee: United Centrifugal Pumps, San Jose, Calif.

[21] Appl. No.: 714,449

[22] Filed: Mar. 21, 1985

[51] Int. Cl.$^4$ .............................................. B23K 15/00
[52] U.S. Cl. ..................... 219/121 PM; 219/121 PP; 219/121 PL; 219/76.16; 219/75
[58] Field of Search ...... 219/121 P, 121 PM, 121 PL, 219/76.16, 75, 74, 121 PN, 121 PP; 313/231.31, 231.41, 231.51; 427/34

[56] References Cited

U.S. PATENT DOCUMENTS

| 3,830,428 | 8/1974 | Dyos | 219/121 PP |
| 4,127,760 | 11/1978 | Meyer et al. | 219/121 PP |
| 4,389,559 | 6/1983 | Rotolico et al. | 219/121 PP |
| 4,521,666 | 6/1985 | Severance, Jr. et al. | 219/121 PQ |

FOREIGN PATENT DOCUMENTS 1288914 9/1972 United Kingdom ........ 219/121 PM

Primary Examiner—M. H. Paschall
Attorney, Agent, or Firm—Ernest M. Anderson

[57] ABSTRACT

A plasma arc torch is disclosed having an upper body of a non-conductive material supporting an electrode and a lower body of a conductive material supporting a nozzle through which an arc is formed between the electrode and a work piece. Means is provided for blowing a mixture of inert gas and a fusible powder through a passageway formed in said lower body and through passages formed in said nozzle onto the work piece. A liquid coolant is circulated through a reservoir formed in the lower body, and an inert gas is discharged through an opening that circumvallates the nozzle. Both the nozzle and the torch as a whole are uniquely constructed to avoid many of the problems caused by the use of insulators and fluid seals. In addition, the novelty of construction enhances performance.

10 Claims, 5 Drawing Figures

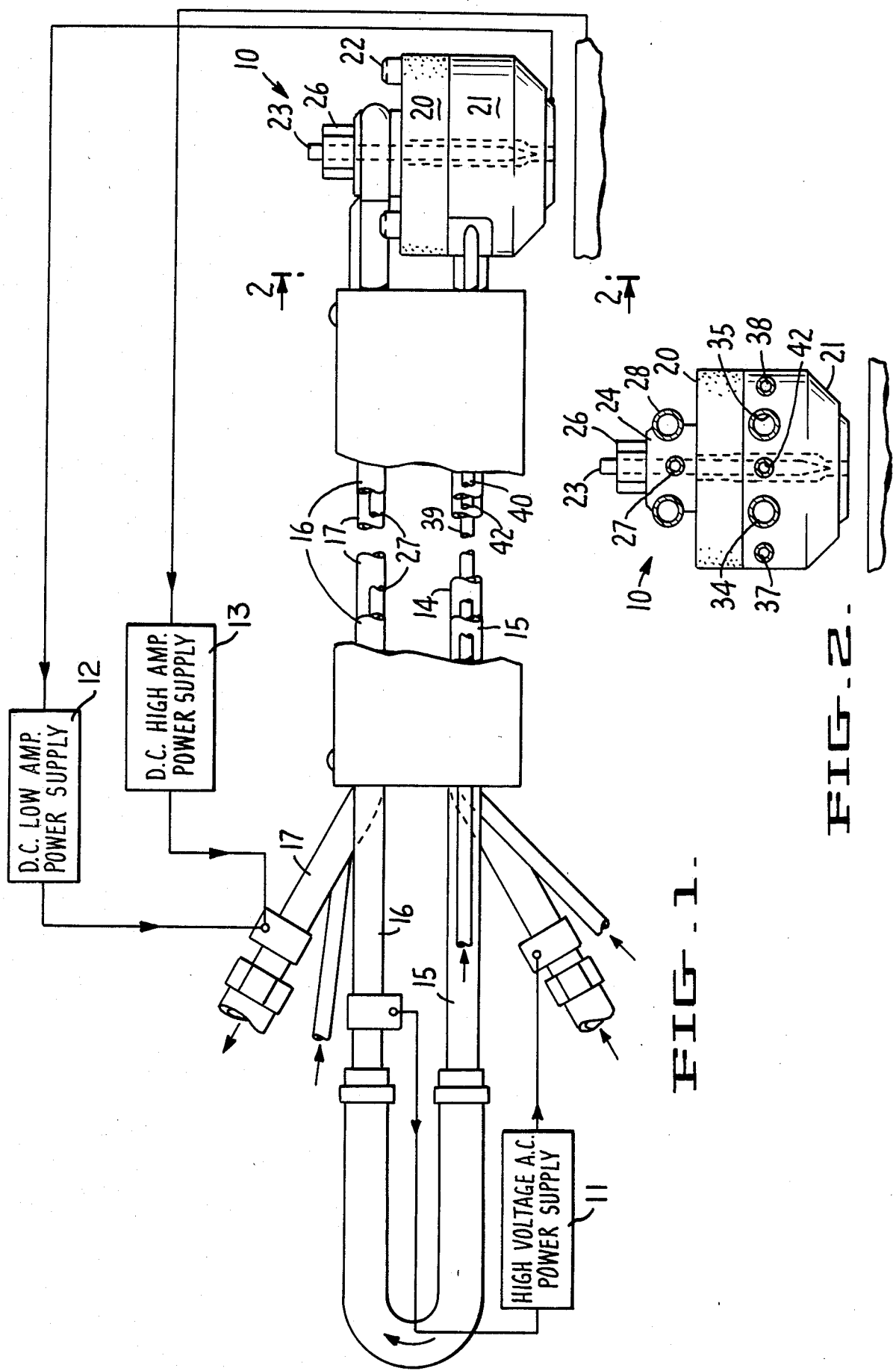

PLASMA TRANSFER WELDED ARC TORCH

BACKGROUND OF THE INVENTION

Spray guns and torches are well known in which heat fusible material in finally divided particulate form is fed into a zone where the material is heat-softened or melted and sprayed onto a surface to be coated. The heat fusible material is ordinarily referred to as powder. Such guns or torches are composed of two main parts, namely, an upper body member which supports an electrode and a lower body member which supports tubes and other parts for forming an arc with the electrode and injecting powder with an inert gas under pressure. Both upper and lower body members are conventionally made of metal and operate at different electrical potentials. It is necessary, therefore, to provide insulators between the two body members. High temperatures of operation also require the incorporation of a cooling system. Conventional torch constructions commonly use O-rings or fluid seals to contain the coolant which is circulated through passages within each body member.

SUMMARY OF THE INVENTION

A principal object of this invention is to provide a torch construction that eliminates many of the problems caused by the use of insulators and fluid seals common to the prior art.

Another object is to provide a torch having an improved nozzle structure for injecting a powder-gas mixture into the arc through a plurality of openings directed convergently toward the Other features and advantages of the invention will become apparent in view of the drawings and the following detailed description.

DESCRIPTION OF THE DRAWINGS

FIG. 1 is a side view of a torch embodying the present invention auxiliary equipment being shown diagramatically;

FIG. 2 is a section taken on the lines 2—2 of FIG. 1;

DESCRIPTION OF THE PREFERRED EMBODIMENT

Referring to FIG. 1, torch 10 operates in a conventional manner in that it utilizes three different power supplies for establishing and maintaining an arc. A high voltage AC power supply 11 is initially used to form an arc; a low voltage low amperage DC power supply 12 establishes a non-transferred pilot arc; and a low voltage high amperage DC voltage supply 13 is utilized to sustain an arc transferred to the work piece. The power supplies are each electrically connected to the torch by copper conduits which also carry coolant liquid. The manner in which those conduits conduct energy to and from torch 10 is described herein following a more detailed description of the torch.

Figure 4:
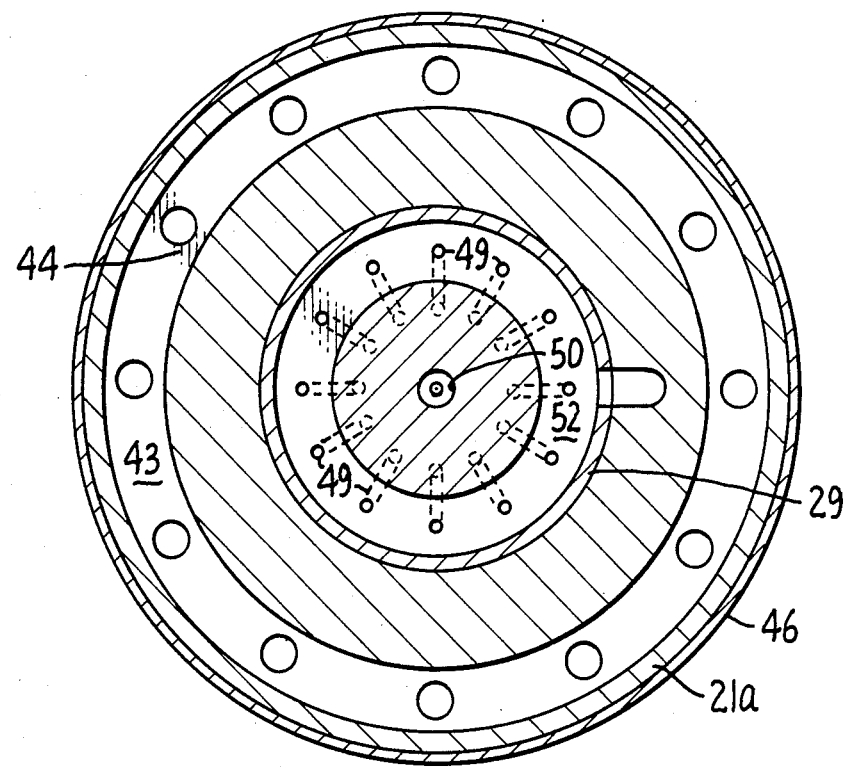
FIG. 4 is a section taken on the broken lines 4—4 of FIG. 3.
Figure 3:
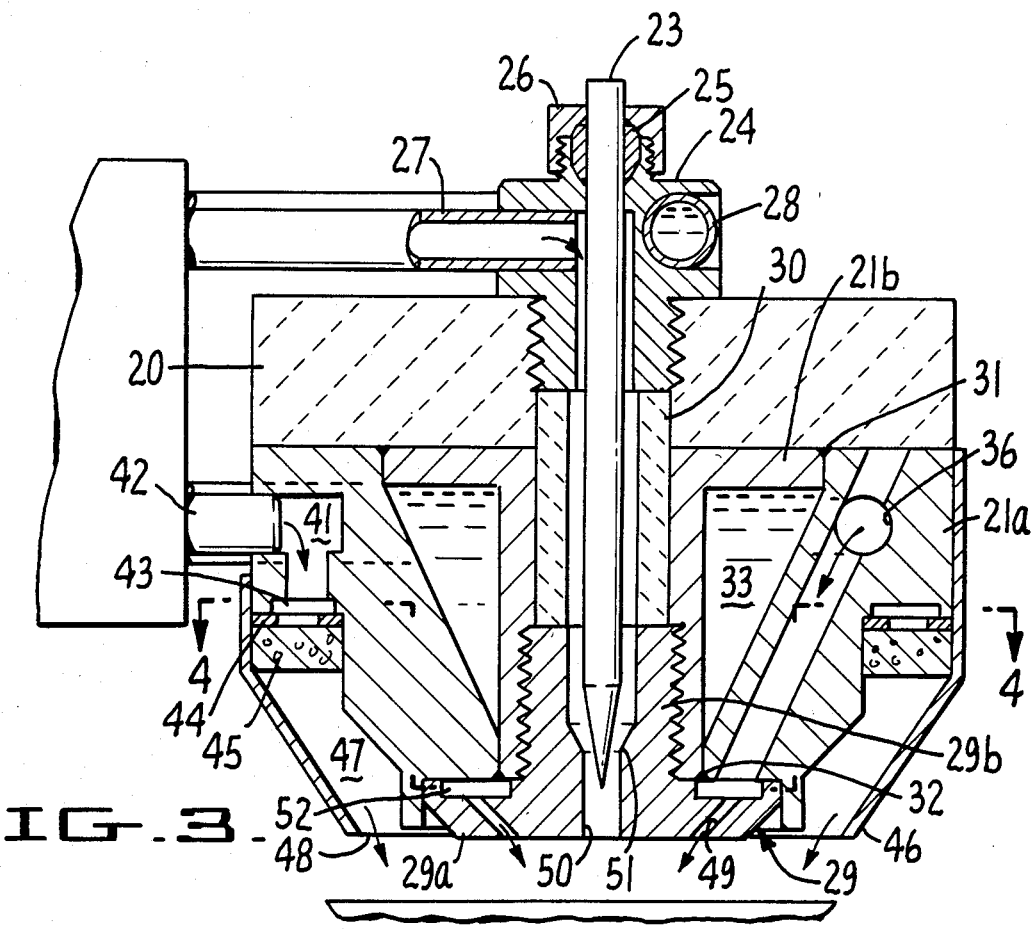
FIG. 3 is a vertical, quarter section taken substantially through the center of the torch.
Figure 5:
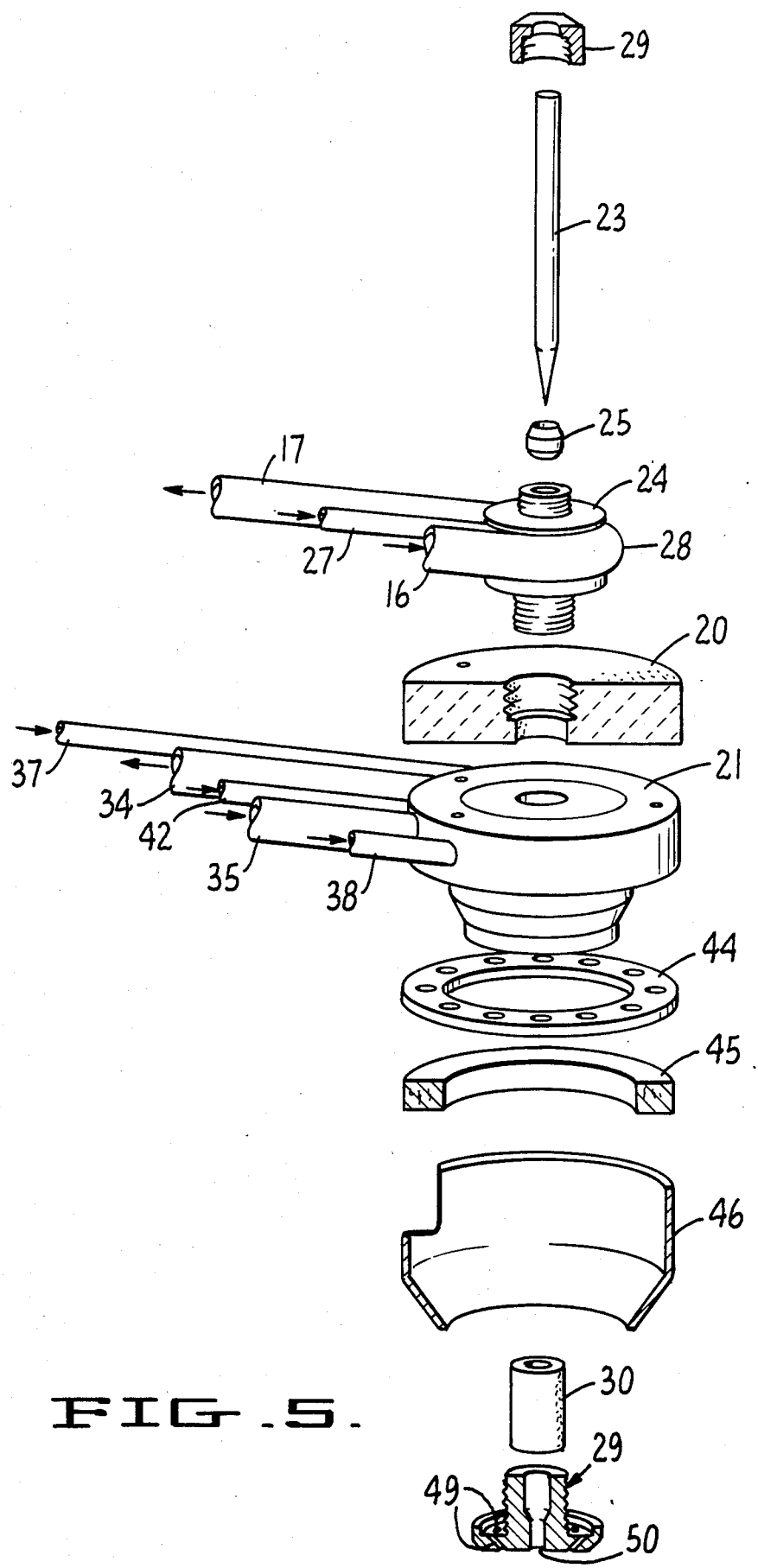
FIG. 5 is an exploded view of the torch, parts thereof being shown partly in perspective and partly in section.

This invention more particularly concerns the construction of torch 10, details of which are best shown in FIGS. 3, 4 and 5. The torch essentially comprises an upper body member 20 and a lower body member 21 which are held together by means of cap screws 22, shown in FIG. 1. Upper body member 20 is made of an insulating material, more particularly a machinable glass ceramic. A suitable material for this purpose is manufactured by Corning Glass Works under the trade name MACOR and is described in detail in the publication American Machinist, dated May 1978. Upper body member 20 supports an electrode 23 mounted in an electrically conductive holder 24 which is threaded into upper body member 20. Electrode 23 is mounted and secured to holder 24 by means of a collapsible compression ring 25 and a threaded cap 26.

Holder 24 is more particularly formed with radial and axial passages that connect with a conduit 27 through which inert gas is passed into contact with and down along electrode 23. A cooling coil 28, through which water is circulated, is secured to the outer surface of holder 24 for conducting heat from the electrode and holder. Both water coolant and electrical energy are conducted to and from coil 28 through a pair of conduits 16 and 17, the operation of which is described later herein.

Lower body portion 21 is made of an electrically conductive material, such as copper, and supports a nozzle 29 that comprises a powder-gas discharge plate 29a supported on a tubular stem 29b. A spacer sleeve 30 formed of insulating material such as MACOR, is lodged between holder 24 and stem 29b.

Lower body member 21 is uniquely formed by welding an outer metallic shell 21a to an inner metallic sleeve 21b, said shell and sleeve having complementary annular upper and lower mating edges welded together as indicated by reference members 31 and 32. A coolant reservoir 33 is formed between the shell and sleeve, and the reservoir connects to an inlet port 34 and an outlet port 35 by means of a pair of passageways, not shown. This construction avoids the use of O-rings or other types of resilient seals which tend to leak. Water coolant is conducted to inlet 34 through conduit 14 and is removed through outlet 35 and conduit 15. Conduit 14 also serves as an electrical return for power supply 11.

The lower end of inner metallic sleeve 21b is internally threaded for receiving the stem end of nozzle 29. This allows the nozzle to be easily replaced. The lower end of shell 21a is dished to receive the powder-gas discharge plate 29a.

Shell 21a is also formed with a second pair of passageways 36 which connect a pressurized mixture of powder and inert gas with a pair of inlet ports 37 and 38. Only one passageway 36 is illustrated for clarity. Ports 37 and 38 connect to a pressurized mixture of powder and inert gas supplied through conduits 39 and 40, as shown in FIG. 1.

One additional passageway 41 formed in a flange portion of shell 21a connects a source of inert gas, supplied through a conduit 42, with an annular plenum defined by a recess 43 formed in the underside of the flange. From that plenum the inert gas passes through openings in a ring shaped baffle 44, then through a ring shaped filter 45 disposed beneath and adjacent the baffle. A shield 46 is mounted to lower body member 20 and therewith defines a conical plenum 47 that conducts and directs inert gas passing through the filter to an annular discharge opening 48 that circumvallates nozzle 29.

A plurality of passages 49 formed in powder-gas discharge plate 29a extend from an upper face to a lower face, said passages being angularly directed, convergent and circumferentially spaced around a central arc port 50 and a venturi 51. The upper face of plate 29a is formed with an annular groove 52, the upper end of each passage 49 being within groove 52, which serves as a plenum for carrying the powder-gas mixture introduced through passageways 36 to each of the passages 49.

A brief description of operation is as follows:

During operation of the torch water is continuously pumped to the lower body member 21 through conduit 14, circulated in reservoir 33 and removed through conduit 15. The water removed through conduit 15 is then circulated through coil 28 passing from conduit 15, through a dielectric coupling, conduit 16 and coil 28, and returned to a coolant reservoir through conduit 17.

Before initializing the pilot arc, an inert gas such as argon is fed through conduit 27, passing around electrode 23, and exiting through the passage 50 of nozzle 29. This purges the torch of oxygen. A high voltage, high frequency electrical signal supplied by power source 11 is then applied through conduit 16 to water coil 28, holder 24 and electrode 23. The high energy voltage jumps an air gap between electrode 23 and the venturi area 51 of nozzle 29, thus creating a high voltage arc at the gap.

The electrical charge then travels from nozzle 29 through lower body member 21 to lower body water inlet 34 and back to power source 11 along conduit 14. At this time, the low voltage power source 12 is applied. A direct current of approximately 20 volts and 40 amperes is connected to conduit 17 and conducted to coil 28, holder 24 and electrode 23. This direct current uses the high voltage arc, of power source 11 to create a pilot arc (referred to as a non-transferred arc since the arc is grounded at the nozzle, not to the work piece, and is contained within the torch itself).

Argon or other inert gas is now introduced through conduit 42 into passage 41, and through baffle 44 and filter 45. The inert gas circulates down the inside of shield 46 circumvallating nozzle 29. This shield gas creates an oxygen free environment for an arc flame and weld puddle, which are yet to be established.

After the pilot arc is stabilized, the high voltage AC power source 11 is no longer needed and is switched off.

When the controller, be it a manual or computer controlled operator, is ready to commence the welding phase of operation, the main welding arc sequence is started. At this time a direct voltage current of high amperage is applied from power source 13 to conduit 17 which again conducts the current to electrode 23 through holder 24 and coil 28. This power supply, however, is grounded to the work piece below nozzle 29, not to the lower body housing (as is the pilot arc power supply 12). After the main or transferred arc has stabilized, the pilot arc power supply 12 is switched off.

At this point, a mixture of powder and inert gas is fed through conduits 39 and 40, through ports 37, 38 and passageways 36, exiting at the lower face of lower body member 21 into groove 52. The powder-gas mixture then exits through passages 49, directing the powder into the main transferred arc where it becomes welded to the work piece.

In summary the following steps occur in the torch welding sequence:

1. Inert gas is introduced through conduit 27 and circulated around electrode 23.
2. High voltage AC power source 11 is applied to electrode 23, forming an arc between the electrode and nozzle 29.
3. Shield gas is then introduced through conduit 42 exiting around nozzle 29 through opening 48.
4. Pilot arc power supply 12 is turned on.
5. High frequency generator power supply 11 is turned off.
6. Main welding arc power supply 13 is applied.
7. Pilot arc supply 12 is turned off, and
8. Powder-gas mixture is supplied through passages 49 of nozzle 29.

Although a preferred embodiment of the invention has been illustrated and described, various modifications and changes may be resorted to without departing from the spirit of the invention or the scope of the appended claims, and each of said modification and changes is contemplated.

What is claimed is:

1. A plasma arc torch having upper and lower body members formed with coaxial passages, an electrode supported from said upper body member within said coaxial passages, and a nozzle having an axial arc port through which an arc is formed between the electrode and a work piece, said lower body member comprising an outer metallic shell and an inner metallic sleeve, said outer shell having a plurality of passageways formed therein including at least one passageway for connecting a coolant reservoir with an external source of coolant, a second passageway for connecting a pressurized mixture of powder and inert gas with said nozzle, and a third passageway for connecting a shield gas with an annular discharge that encircles the nozzle, the lower end of said inner metallic sleeve being internally threaded, said nozzle having a powder-gas discharge plate supported on a tubular stem threadably engaged with the lower end of said sleeve, said powder-gas discharge plate having a plurality of passages extending from an upper face to a lower face, said passages being angularly directed, convergent and circumferentially spaced around the axial arc port of said nozzle; and an annular plenum defined between the upper face of said powder-gas discharge plate and the lower end of said outer metallic shell, said annular plenum being in communication with the second passageway and the plurality of passages.

2. The plasma arc torch of claim 1, the upper face of said powder-gas discharge plate being formed with an annular groove, the ends of the plurality of passages formed in said plate terminating within said groove, said groove defining one portion of the plenum for a powder-gas mixture.

3. The plasma arc torch of claim 1 said outer metllic shell having an upper annular flange, said third passageway being formed through said flange interconnecting a radial inlet port with a discharge port formed in the underside of said flange.

4. The plasma arc torch of claim 1, said upper body member being formed of a machinable, electrical insulating material; and an electricaly conductive holder threadably mounted to said upper body member for supporting said electrode in spaced relation to said lower body member and nozzle.

5. The plasma arc torch of claim 4 and further comprising means supported upon said upper body for cooling said electrode.

6. The plasma arc torch of claim 1, the lower end of said lower body being dished to receive the powder-gas discharge plate.

7. The plasma arc torch of claim 4 and further comprising a spacer sleeve formed of insulating material received within the upper end of said shell and lodged between said electrically conductive holder and said nozzle.

8. A plasma arc torch having upper and lower body members formed with coaxial passages, an electrode supported from said upper body member and within said coaxial passages, and a nozzle supported from the lower end of said lower body member, said nozzle having an axial passage through which an arc is formed between the electrode and a workpiece, said lower body member and nozzle define an annular plenum, said lower body member being formed with a passageway for connecting a pressurized mixture of powder and inert gas with said annular plenum, said nozzle having a plurality of passages in open communication with said annular plenum, each passage being angularly directed and convergent with respect to the axial passage and circumferentially spaced around said axial passage, whereby a pressurized mixture of powder and inert gas is passed through said lower body member into the annular plenum and convergently directed through the plurality of passages formed in the nozzle, said lower body member being internally threaded, said nozzle having a powder-gas discharge plate supported on a tubular stem threadably engaged with the lower body member.

9. The plasma arc torch of claim 8, the upper face of said powder-gas discharge plate being formed with an annular groove, the ends of the plurality of passages formed in said nozzle terminating wilhin said groove, said groove defining one portion of Lhe plenum for a powder-gas mixture.

10. The plasma arc torch of claim 8, the lower end of said lower body being dished to receivee the powder-gas discharge plate.

* * * * *

UNITED STATES PATENT OFFICE
CERTIFICATE OF CORRECTION

Patent No. 4,672,171      Dated June 9, 1987

Inventor(s) Andrew D. Cusimano and Danny W. Humes

It is certified that error appears in the above-identified patent and that said Letters Patent are hereby corrected as shown below:

Column 1, line 33; after "the" insert -- work piece. --

Column 6, line 15; change "wilhin" to -- within --

Column 6, line 16; change "Lhe" to -- the --

Column 6, line 19; change "receivee" to -- receive --

Signed and Sealed this

Tenth Day of November, 1987

Attest:

DONALD J. QUIGG

*Attesting Officer*     *Commissioner of Patents and Trademarks*